D. J. RAYMOND.
OPERATING DEVICE FOR SPLIT WHEEL RIMS.
APPLICATION FILED JULY 17, 1915.
1,163,456.
Patented Dec. 7, 1915.
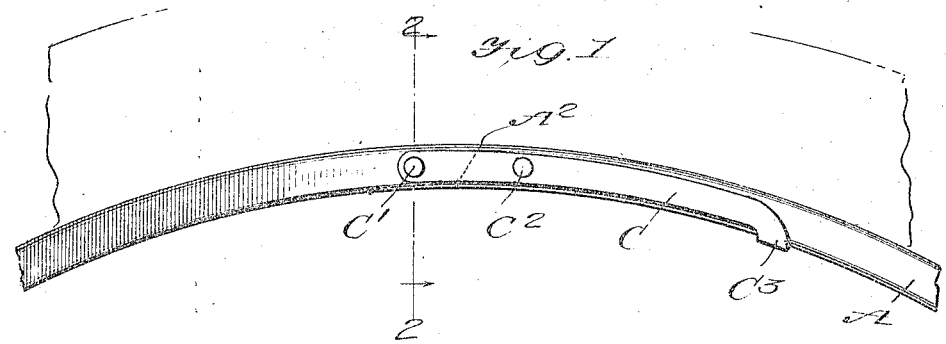
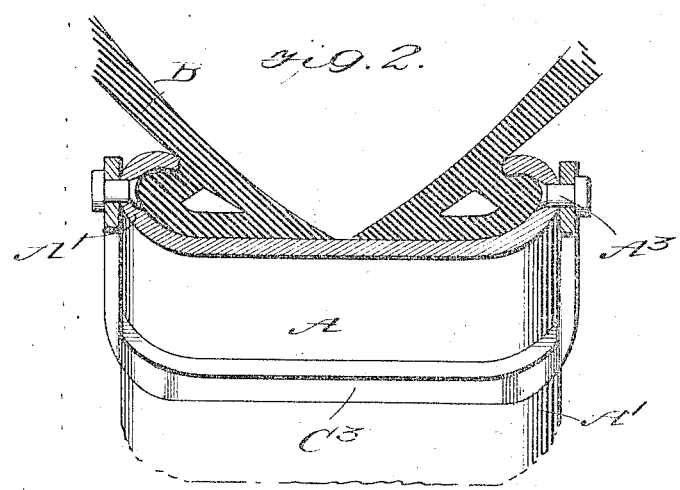
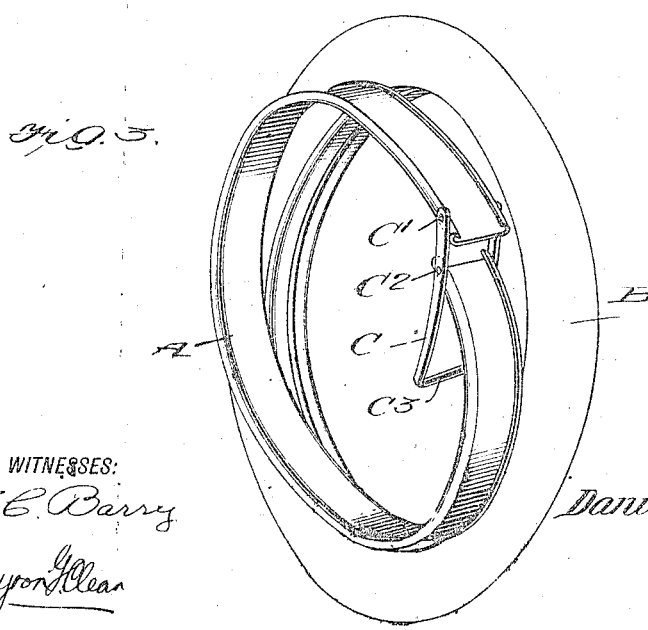
WITNESSES:
F. C. Barry
Myron H. Clear
INVENTOR
Daniel J. Raymond
BY
Munn & Co.
ATTORNEYS

UNITED STATES PATENT OFFICE.

DANIEL JOSEPH RAYMOND, OF CRANDON, WISCONSIN.

OPERATING DEVICE FOR SPLIT WHEEL-RIMS.

1,163,456.  Specification of Letters Patent.  Patented Dec. 7, 1915.

Application filed July 17, 1915. Serial No. 40,414.

*To all whom it may concern:*

Be it known that I, DANIEL J. RAYMOND, a citizen of the United States, and a resident of Crandon, in the county of Forest and State of Wisconsin, have invented a certain new and useful Improvement in Operating Devices for Split Wheel-Rims, of which the following is a specification.

My present invention relates generally to split wheel rims, and more particularly to an implement or means in connection therewith, and forming a permanent part thereof, for reducing the split rim when it is desired to release a tire therefrom, said implement and means acting, when in closed position, as a brace for supporting the free ends of the rim on opposite sides of its gap in operative position.

With these objects in mind, my invention resides in the constructions, arrangements, and operations of the rim operating tool to be now described in connection with a rim, all as shown in the accompanying drawing, forming a part of this specification, and in which—

Figure 1 is a side elevation of a portion of a rim equipped with my improvement. Fig. 2 is a cross section therethrough taken substantially on line 2—2 of Fig. 1, and Fig. 3 is a detail perspective view illustrating the operation of reducing the split rim and its removal from a tire.

Referring now to the accompanying drawing, it will be seen that the rim A as shown is of conventional form, having the rounded side edges A' as best seen in Fig. 2 whereby as usual to inclose the inner portion of the tire B, the rim being transversely split as indicated at A² in Fig. 1 so as to permit of its reduction in circumference, and the consequent removal of the tire B when desired, as best seen in Fig. 3. To this end I provide an operating implement or means in the form of a U-shaped lever C, the extensions of which are pivotally connected at C' and C², spaced points in the length thereof, to the opposite free ends of the rim A upon opposite sides of its gap A², all as clearly seen by reference to Figs. 1 and 2, the extensions of the lever C thus lapping the gap between the free ends of the rim, and the cross bar C³ of the lever extending across the inner periphery of the rim as plainly seen in the same figure, whereby in the closed position of the parts as seen in Figs. 1 and 2, the lever C forms an effective brake, extending as it does across the inner side of the rim and along opposite sides thereof across its gap, so that the rim is better held in its normal position as indicated in Figs. 1 and 2, wherein the tire is clamped in position. Thus with the parts as shown in Figs. 1 and 2, it is simply necessary to depress or thrust inwardly the outer end or cross bar C³ of the lever C in order to throw one free end of the rim A inwardly and to a position eccentric with respect to the true axis thereof, the result being to reduce the rim in circumference and permit of the free withdrawal of the tire B as best seen by reference to Fig. 3.

The pivotal connections C' and C² may be formed in any suitable manner, but are preferably in the nature of studs A³ rigidly connected by brazing or otherwise to the curved sides A' of the rim A so as to eliminate all necessity of mutilation of the rim and adapt my improved implement to be associated with rims now in use and obviate the necessity of manufacture of special rims as is necessary with other implements of this nature now upon the market.

I claim:—

1. The combination with a split rim, of an operating device including a U-shaped lever, the extensions of which are spaced apart a distance slightly greater than the width of the rim and are pivotally connected at spaced points thereof to the free ends of the rim upon opposite sides of its gap, and the cross bar of which lever extends transversely across the inside of the rim for the entire width of the rim and engages the latter in its closed position whereby to form a strengthening brace during the normal operation of the rim.

2. The combination with a split rim having laterally projecting side studs at opposite sides of its split portion, of an operating device including a lever having extensions which project along opposite the said sides of the rim and across the gap thereof, and are pivotally connected at spaced points thereof to the said studs of the rim upon opposite sides of its gap, whereby to lap the split portions of the rim at opposite sides thereof, a part of said lever, connecting said extensions, being extended across the inner periphery of the rim.

DANIEL JOSEPH RAYMOND.

In presence of—
W. A. WESCOTT,
FRED J. ROGERS.